(12) United States Patent
Singi et al.

(10) Patent No.: US 11,044,096 B2
(45) Date of Patent: Jun. 22, 2021

(54) BLOCKCHAIN BASED DIGITAL IDENTITY GENERATION AND VERIFICATION

(71) Applicant: Accenture Global Solutions Limited, Dublin (IE)

(72) Inventors: Kapil Singi, Bangalore (IN); Swapnajeet Gon Choudhury, Bangalore (IN); Vikrant S. Kaulgud, Pune (IN); Jagadeesh Chandra Bose Rantham Prabhakara, Chittoor (IN); Sanjay Podder, Thane (IN); Adam Patten Burden, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 183 days.

(21) Appl. No.: 16/385,802

(22) Filed: Apr. 16, 2019

(65) Prior Publication Data
US 2020/0252219 A1 Aug. 6, 2020

Related U.S. Application Data

(60) Provisional application No. 62/800,838, filed on Feb. 4, 2019.

(51) Int. Cl.
*H04L 9/32* (2006.01)
*H04L 9/06* (2006.01)
(Continued)

(52) U.S. Cl.
CPC .......... *H04L 9/3236* (2013.01); *H04L 9/0637* (2013.01); *H04L 9/0643* (2013.01);
(Continued)

(58) Field of Classification Search
CPC ... H04L 9/3236; H04L 9/0643; H04L 9/0637; H04L 2209/38; H04L 9/3239;
(Continued)

(56) References Cited

U.S. PATENT DOCUMENTS 8,745,616 B1 * 6/2014 Deacon .................. H04L 63/12
717/177
10,263,783 B2 * 4/2019 Bohli ...................... G06F 21/64
(Continued)

OTHER PUBLICATIONS

Wikipedia, "Merkle tree", https://en.wikipedia.org/wiki/Merkle_tree, Apr. 4, 2019, 4 pages.
(Continued)

*Primary Examiner* — David Garcia Cervetti
(74) *Attorney, Agent, or Firm* — Harrity & Harrity, LLP

(57) ABSTRACT

A device may obtain information identifying a base application. The device may extract a set of sub-application artifacts associated with the base application based on structural information associated with the base application. The device may define a set of metadata attributes associated with the set of sub-application artifacts associated with the base application. The device may generate a set of hash tuples for the set of metadata attributes associated with the set of sub-application artifacts associated with the base application. The device may generate a base composite identity of the base application based on the set of hash tuples. The device may store the base composite identity in a blockchain and in connection with storage of the base application in the blockchain to enable subsequent identification and verification of the base application.

20 Claims, 9 Drawing Sheets

(51) Int. Cl.
*H04W 12/06* (2021.01)
*H04W 12/108* (2021.01)

(52) U.S. Cl.
CPC ......... *H04W 12/06* (2013.01); *H04W 12/108* (2021.01); *H04L 2209/38* (2013.01)

(58) Field of Classification Search
CPC ..... H04L 63/12; H04L 63/0876; H04L 67/10; H04L 67/34; H04L 9/3247; H04L 9/3297; H04L 9/3242; H04W 12/06; H04W 12/1008; G06F 21/44; G06F 8/60; G06F 21/51
See application file for complete search history.

(56) References Cited

U.S. PATENT DOCUMENTS

| | | | | |
|---|---|---|---|---|
| 10,339,299 | B1* | 7/2019 | Magnuson | H04L 9/3239 |
| 10,628,577 | B2* | 4/2020 | Koohgoli | G06F 8/751 |
| 10,853,481 | B1* | 12/2020 | Magnuson | G06F 21/52 |
| 10,853,592 | B2* | 12/2020 | Rodriguez | H04L 63/0838 |
| 2005/0132202 | A1* | 6/2005 | Dillaway | H04L 9/3226 713/179 |
| 2006/0085465 | A1* | 4/2006 | Nori | G06F 16/213 |
| 2006/0288353 | A1* | 12/2006 | King | G06F 8/43 719/331 |
| 2008/0034350 | A1* | 2/2008 | Conti | G06F 21/74 717/124 |
| 2009/0222674 | A1* | 9/2009 | Leichsenring | G06F 21/51 713/193 |
| 2010/0153918 | A1* | 6/2010 | Mallick | G06F 8/71 717/121 |
| 2011/0093701 | A1* | 4/2011 | Etchegoyen | G06F 21/121 713/165 |
| 2011/0119651 | A1* | 5/2011 | Utschig-Utschig | G06F 8/35 717/107 |
| 2011/0154010 | A1* | 6/2011 | Springfield | H04L 9/3234 713/100 |
| 2011/0179477 | A1* | 7/2011 | Starnes | H04L 63/12 726/9 |
| 2014/0173761 | A1* | 6/2014 | Hong | G06F 21/10 726/30 |
| 2014/0245268 | A1* | 8/2014 | Golender | G06F 11/3636 717/128 |
| 2014/0298420 | A1* | 10/2014 | Barton | H04L 63/10 726/4 |
| 2015/0271679 | A1* | 9/2015 | Park | H04W 12/37 713/187 |
| 2016/0294559 | A1* | 10/2016 | Dabak | G06F 9/45558 |
| 2017/0147819 | A1* | 5/2017 | Vasilenko | G06F 21/554 |
| 2017/0185774 | A1* | 6/2017 | Sahita | G06F 21/577 |
| 2017/0242719 | A1* | 8/2017 | Tsirkin | G06F 9/4403 |
| 2017/0250972 | A1* | 8/2017 | Ronda | H04L 63/123 |
| 2017/0257361 | A1* | 9/2017 | Niemela | G06F 21/51 |
| 2017/0357496 | A1* | 12/2017 | Smith | H04L 9/3228 |
| 2018/0018459 | A1* | 1/2018 | Zhang | G06F 21/554 |
| 2018/0019876 | A1* | 1/2018 | Moss | G06F 21/64 |
| 2018/0165781 | A1* | 6/2018 | Rodriguez | G06Q 40/00 |
| 2018/0176229 | A1* | 6/2018 | Bathen | H04W 12/106 |
| 2018/0191739 | A1* | 7/2018 | Kraft | G06F 21/566 |
| 2018/0198626 | A1* | 7/2018 | Kroonmaa | H04L 9/0637 |
| 2019/0123890 | A1* | 4/2019 | Scott | H04L 9/0643 |
| 2019/0156023 | A1* | 5/2019 | Gerebe | H04L 9/3226 |
| 2019/0163911 | A1* | 5/2019 | Kliewer | H04L 9/3239 |
| 2019/0199518 | A1* | 6/2019 | Rady | H04L 9/0866 |
| 2019/0207769 | A1* | 7/2019 | Donohoe | G06F 21/6245 |
| 2019/0222575 | A1* | 7/2019 | Oberhauser | H04L 63/0869 |
| 2019/0245680 | A1* | 8/2019 | Boutaba | G06F 21/64 |
| 2019/0272291 | A1* | 9/2019 | Imai | G06F 16/00 |
| 2019/0334920 | A1* | 10/2019 | Kelly | H04L 9/3239 |
| 2019/0394204 | A1* | 12/2019 | Bansal | H04L 63/0853 |
| 2020/0057760 | A1* | 2/2020 | Zhao | G06F 16/2379 |
| 2020/0076613 | A1* | 3/2020 | Ciscato | H04L 9/3247 |
| 2020/0134189 | A1* | 4/2020 | Carter | H04L 9/3239 |
| 2020/0204557 | A1* | 6/2020 | Singh | H04L 9/0637 |
| 2020/0250344 | A1* | 8/2020 | Rahn | H04L 9/3247 |

OTHER PUBLICATIONS

Wikipedia, "Blockchain", https://en.wikipedia.org/wiki/Blockchain, Apr. 16, 2019, 18 pages.
Jake Frankenfield, "Smart Contracts", https://www.investopedia.com/terms/s/smart-contracts.asp#ixzz4ylPuDogc, Apr. 14, 2019, 6 pages.
Wikipedia, "Digital identity", https://en.wikipedia.org/wiki/Digital_identity, Mar. 26, 2019, 9 pages.

* cited by examiner

BLOCKCHAIN BASED DIGITAL IDENTITY GENERATION AND VERIFICATION

RELATED APPLICATION(S)

This application claims priority under 35 U.S.C. § 119 to U.S. Provisional Patent Application No. 62/800,838, filed on Feb. 4, 2019, the content of which is incorporated by reference herein in its entirety.

BACKGROUND

Software development projects may be completed by globally distributed teams of hundreds or even thousands of developers. Each team may perform development activities, such as software coding, quality control checking, software integration, software packaging, and/or the like. Further, third-parties, such as component manufacturers, hardware suppliers, third-party software tool developers, and/or the like may also perform tasks relating to a software development project. For example, a component manufacturer may load software onto a manufactured hardware component. Similarly, a third-party software tool developer may test a third-party software tool on a software application to determine compatibility. Each software development project may include hundreds, thousands, or even millions of artifacts, such as packages, modules, components, code libraries, and/or the like. Developers may develop multiple versions of each artifact during a project lifecycle of a software application development project.

SUMMARY

According to some implementations, a method may include obtaining, by a device, information identifying a base application; extracting, by the device, a set of sub-application artifacts associated with the base application based on structural information associated with the base application; defining, by the device, a set of metadata attributes associated with the set of sub-application artifacts associated with the base application; generating, by the device, a set of hash tuples for the set of metadata attributes associated with the set of sub-application artifacts associated with the base application, wherein a hash tuple, of the set of hash tuples, includes a metadata hash associated with metadata for a metadata attribute of the set of metadata attributes, a content hash associated with content of a sub-application artifact of the set of sub-application artifacts and associated with the metadata attribute, and a combined hash associated with the metadata hash and the content hash; generating, by the device, a base composite identity of the base application based on the set of hash tuples; and storing, by the device, the base composite identity in a blockchain and in connection with storage of the base application in the blockchain to enable subsequent identification and verification of the base application.

According to some implementations, a device may include one or more memories; and one or more processors, communicatively coupled to the one or more memories, configured to: obtain information identifying a base application; extract a set of sub-application artifacts associated with the base application based on structural information associated with the base application; define a set of metadata attributes associated with the set of sub-application artifacts associated with the base application; generate a set of hash tuples for the set of metadata attributes associated with the set of sub-application artifacts associated with the base application, wherein a hash tuple, of the set of has tuples, includes a metadata hash associated with metadata for a metadata attribute of the set of metadata attributes, a content hash associated with content of a sub-application artifact of the set of sub-application artifacts and associated with the metadata attribute, and a combined hash associated with the metadata hash and the content hash; generate a base composite identity of the base application based on the set of hash tuples; and store the base composite identity in a blockchain and in connection with storage of the base application in the blockchain to enable subsequent identification and verification of the base application.

According to some implementations, a non-transitory computer-readable medium may store one or more instructions. The one or more instructions, when executed by one or more processors of a device, may cause the one or more processors to: obtain information identifying a base application; extract a set of sub-application artifacts associated with the base application based on structural information associated with the base application; define a set of metadata attributes associated with the set of sub-application artifacts associated with the base application; generate a set of hash tuples for the set of metadata attributes associated with the set of sub-application artifacts associated with the base application, wherein a hash tuple, of the set of hash tuples, includes a metadata hash associated with metadata for a metadata attribute of the set of metadata attributes, a content hash associated with content of a sub-application artifact of the set of sub-application artifacts and associated with the metadata attribute, and a combined hash associated with the metadata hash and the content hash; generate a base composite identity of the base application based on the set of hash tuples; and store the base composite identity in a blockchain and in connection with storage of the base application in the blockchain to enable subsequent identification and verification of the base application.

DETAILED DESCRIPTION

Figure 1A:
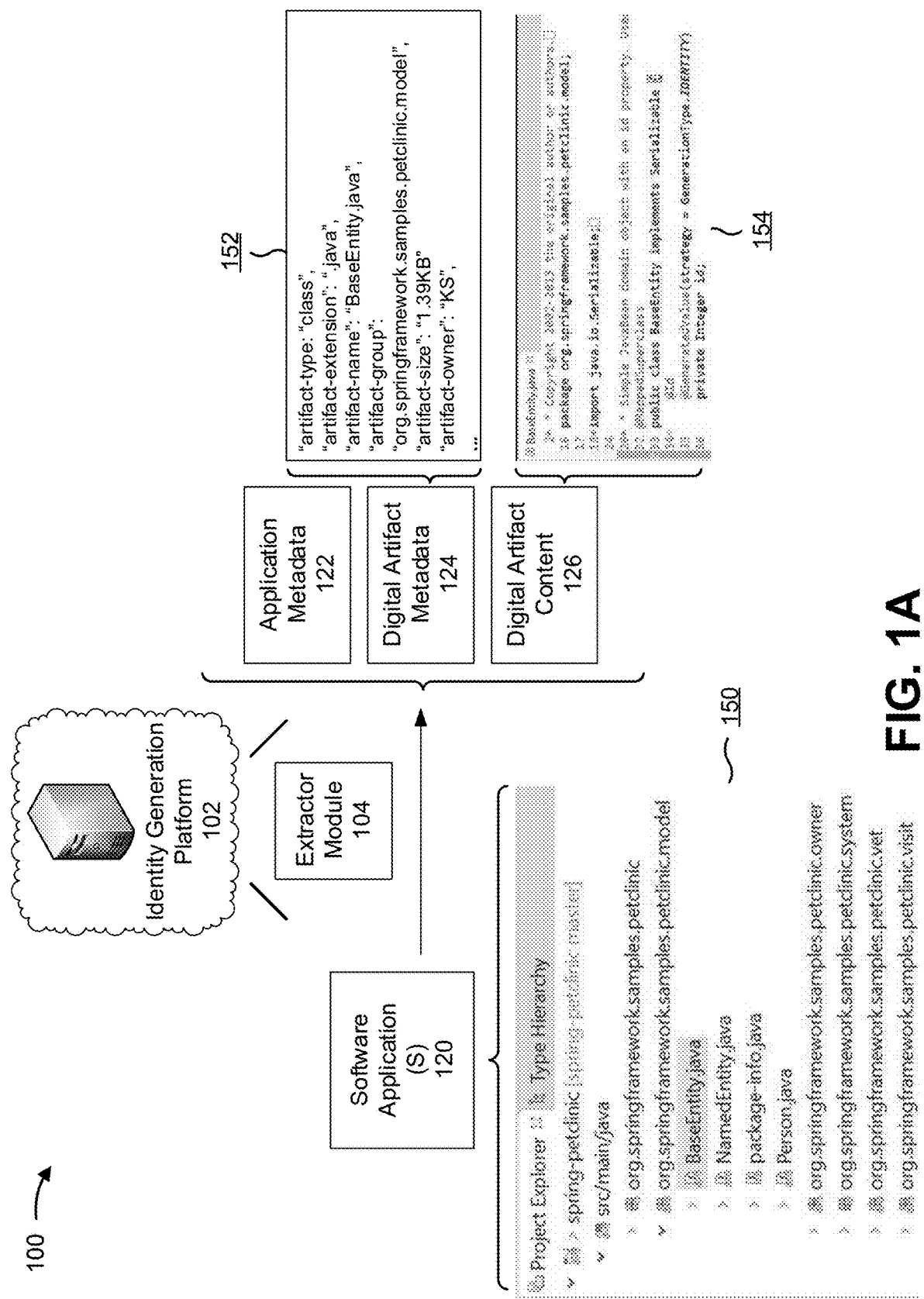
FIGS. 1A-1D are diagrams of an example implementation described herein.

The following detailed description of example implementations refers to the accompanying drawings. The same reference numbers in different drawings may identify the same or similar elements.

During development of a software application, thousands of developers may work collaboratively on different portions of the software application. Such a software development project may include a first team developing a first artifact (e.g., a package), a second team developing a second artifact (e.g., a code library), and hundreds of other teams developing thousands or millions of other artifacts. Collectively, the artifacts may interact to enable the software application. For example, the package may integrate the code library to perform various functions. In this case, an error in, for example, the code library may cause the package to fail to operate correctly. In increasingly complex software applications, millions of artifacts may be associated with millions of dependencies and interactions, and an error with a single artifact can compromise functioning of a whole software application.

A software application may undergo many changes during the development process. For example, each artifact may be associated with multiple versions that may be periodically updated during a development process. In some cases, an organization may term a group of teams as untrusted entities, who are not authorized to change the software application without further approval. For example, a team developing a code library may be prohibited from adding the code library to the software application until the code library is thoroughly tested to ensure that adding the code library will not cause a negative impact to the software application. This may reduce a likelihood that the software application is inadvertently damaged during the development process as a result of errors or inconsistencies in a single artifact. However, despite setting rules about which team members may alter a software development project, discrepancies may be inadvertently or maliciously introduced into a software application as a result of a need for multiple distributed teams of developers, testers, quality assurance personnel, managers, vendors, third-parties, and/or the like. A failure to identify such a discrepancy in a timely manner may result in delays in deployment of the software application, cost overruns, errors in a final deployment of the software application, and/or security vulnerabilities.

When a software application is stored in an environment that is accessible by multiple users, a hash may be used to uniquely represent the software application, which may enable verification that the software application remains unchanged. In this case, a hashing algorithm may be applied to program code of the software application to unambiguously identify the software application, thereby reducing a risk that a discrepancy introduced into the software application is unnoticed. For example, in open-source software development, an MD5 checksum may be evaluated in connection with a software application to ensure that the software application that a user downloads matches the software application that the developer provided (e.g., by comparing respective MD5 checksums). In this way, vulnerabilities associated with a malicious file replacing the software application, man-in-the-middle attacks, and/or the like may be reduced. However, the hashing algorithm generates a monolithic identity for the software application. While such a monolithic identity may reduce a security risk for an individual user, the black-box nature of hashing algorithms makes identifying which portion of a software application has been altered almost impossible.

Some implementations described herein may use blockchain based digital identity generation and verification. For example, an identity generation platform may generate a base composite identity for a software application based on a set of sub-identities for a set of sub-application artifacts of the software application and may save the base composite identity to a blockchain. In this case, when a software application is to be verified, the identity generation platform may generate a verification composite identity and compare the verification composite identity to the base composite identity. If the verification composite identity and the base composite identity match, the identity generation platform may determine that the software application from which the verification composite identity was generated is unaltered relative to a version from which the base composite identity was generated. In contrast, if the verification composite identity does not match the base composite identity, the identity generation platform may compare each sub-identity to determine which artifact of the software application has been altered. In this way, the identity generation platform may identify discrepancies in large, complex software applications, thereby improving the software development process, reducing scheduling or cost overruns, reducing security vulnerabilities, reducing computing resources associated with identifying discrepancies, and/or the like. Further, the identity generation platform may automatically resolve an identified discrepancy by replacing an altered artifact of the software application with an unaltered version of the artifact. In this way, identity generation platform enables automated software application version management and issue resolution.

FIGS. 1A-1D are diagrams of an example implementation 100 described herein. As shown in FIG. 1A, example implementation 100 includes an identity generation platform 102.

As further shown in FIG. 1A, identity generation platform 102 may include an extractor module 104 to extract information from a software application 120, which may be termed S. In some implementations, a software application may include multiple artifacts from which to extract information, such as attributes, metadata, code, and/or the like. For example, as shown by reference number 150, S may include a hierarchical arrangement of packages, code, libraries, functions, and/or the like. In this case, when extracting information from software application 120, identity generation platform 102 may extract application metadata 122 identifying the hierarchical arrangement of the artifacts of S, a file extension of S, a size of S, an ownership of S, a type of S, and/or the like. In some implementations, a software application may include one or more segments of code configured to perform a group of coordinated functions, tasks, or activities for an end user and may be associated with a particular runtime environment, hardware environment, and/or the like. For example, S may include one or more packages, folders, classes, methods, files, libraries, modules, archives (e.g., java archive files), link libraries (e.g., dynamic link library files), and/or the like.

In some implementations, identity generation platform 102 may extract, for each artifact of S, digital artifact metadata 124. For example, as shown by reference number 152, identity generation platform 102 may determine artifact type information, extension information, name information, group information, framework information, size information, ownership information, and/or the like. In some implementations, identity generation platform 102 may omit one or more artifacts from extraction, and may subsequently omit one or more artifacts from identity generation. In some implementations, identity generation platform 102 may store extracted digital artifact metadata 124 and other information described herein using a smart contract-based blockchain.

In some implementations, identity generation platform 102 may extract, for each artifact of S, digital artifact content 126. For example, as shown by reference number 154, identity generation platform 102 may extract program code of each artifact of S, library contents of each artifact of S, package contents of each artifact of S, and/or the like.

Figure 1B:
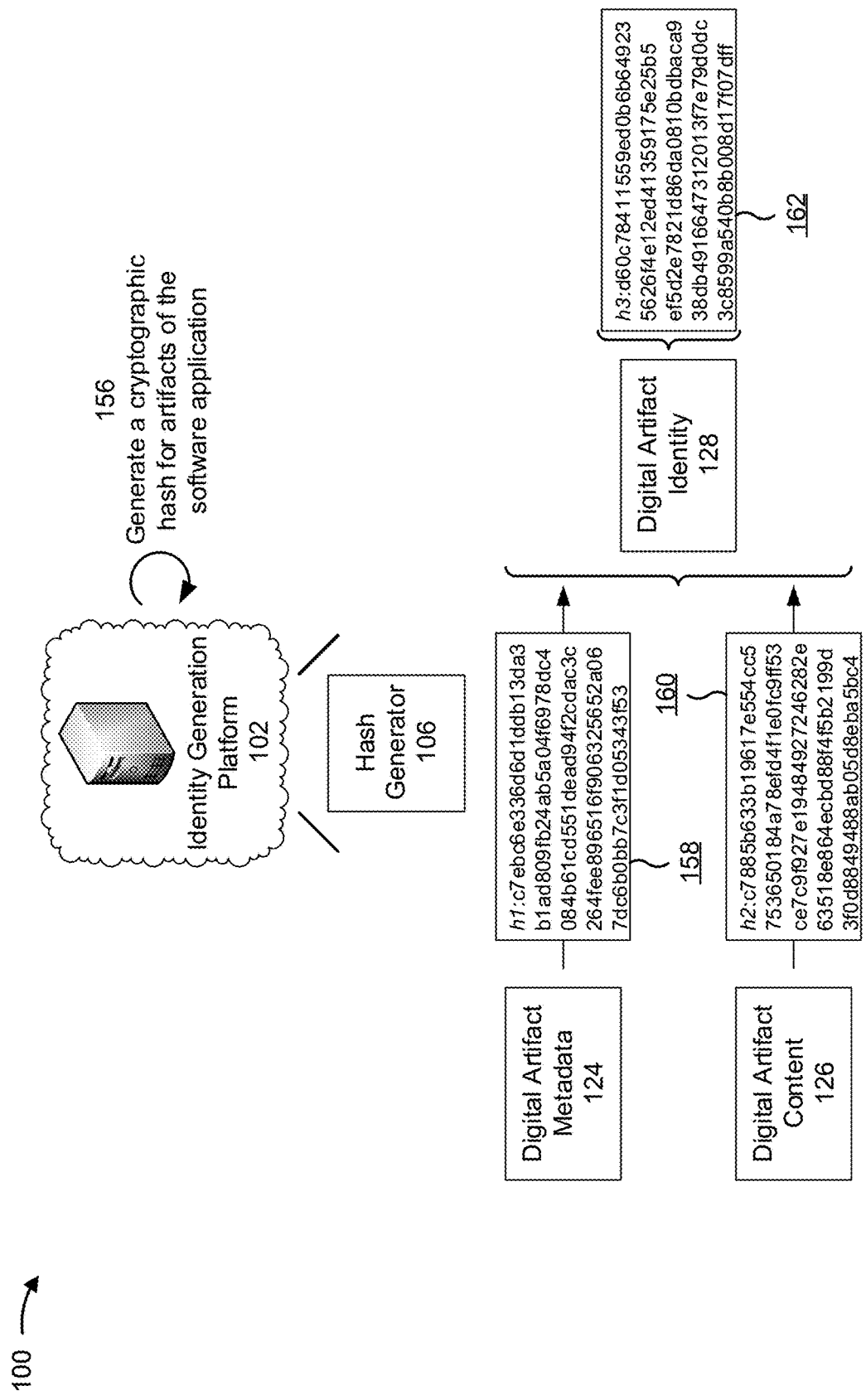

As shown in FIG. 1B, and by reference number 156, identity generation platform 102 may use a hash generator 106 to generate a set of cryptographic hashes for artifacts of the software application. Although some implementations are described with regard to a cryptographic hash, other unique identifiers and terminologies may be applicable, such as generation of a message digest, a digital fingerprint, a digest, a checksum, and/or the like. For example, identity generation platform 102 may generate, for each artifact, a hash tuple that includes a set of three hashes. In this case, as shown by reference numbers 158 and 160, identity generation platform 102 may generate a first hash, h1, and a second hash, h2, based on digital artifact metadata 124 and digital artifact content 126, respectively. As shown by reference number 162, based on generating hashes h1 and h1, identity generation platform 102 may generate a third hash, h3, by hashing h1 and h2, and the hash tuple {h1, h2, h3} may form a digital artifact identity 128 for a particular sub-application artifact of S.

Figure 1C:
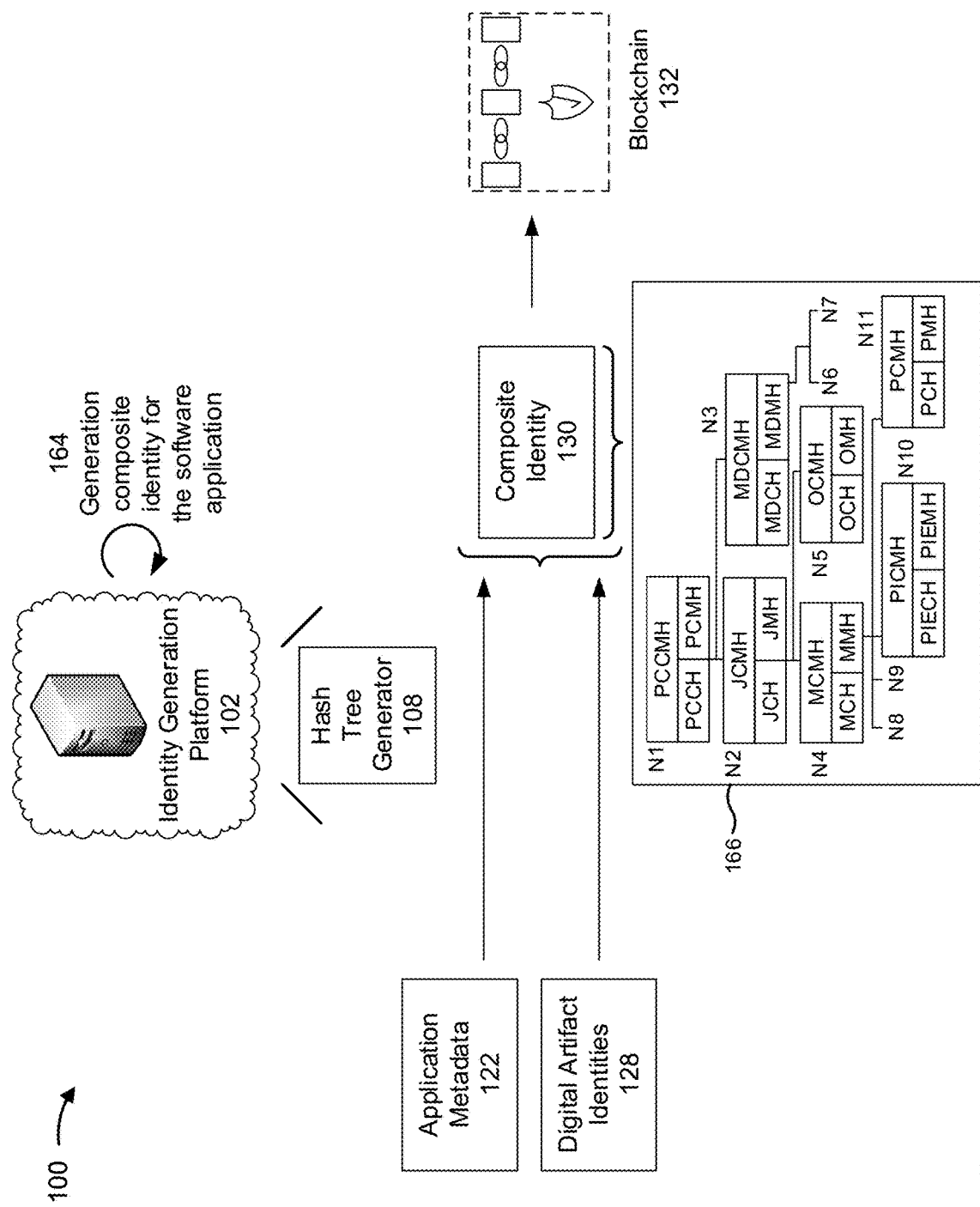

As shown in FIG. 1C, and by reference number 164, identity generation platform 102 may use a hash tree generator 108 to generate a hash tree and a composite identity based on digital artifact identities 128 of each artifact of S. For example, identity generation platform 102 may arrange each digital artifact identity into a tree arrangement (e.g., a Merkle tree) based on the hierarchical arrangement of S, and may hash the digital artifact identities 128 to generate a composite identity 130. In this case, each leaf node of the hash tree may be labelled with a hash of a data block and each non-leaf node of the tree may be labelled with a hash of the labels of child nodes of the non-leaf node.

As further shown in FIG. 1C and by reference number 166, the hash tree may include a set of nodes N1-N11, which represent hash tuples of digital artifact identities 128 corresponding to each artifact of S. For example, a first artifact represented by node N1, may include a digital artifact identity 128 with a hash tuple {PCCH, PCMH, PCCMH}. Node N1 may be a root of leaves represented by nodes N2 and N3. For example, node N2 may represent a second artifact that is hierarchically inferior to the first artifact, and which has a digital artifact identity 128 with a hash tuple {JCH, JMH, JCMH}. Similarly, for example, node N3 may represent a third artifact that is hierarchically inferior to the first artifact, and which has a digital artifact identity with a hash tuple {MDCH, MDMH, MDCMH}. Finally, for example, a node N4 may represent a fourth artifact that is hierarchically inferior to the second artifact, and which has a digital artifact identity with a hash tuple {MCH, MMH, MCMH}.

In this case, identity generation platform 102 may generate a hash of the hash tree and application metadata 122 to generate composite identity 130, and may store composite identity 130 and the hash tree in blockchain 132. For example, identity generation platform 102 may combine each hash of the hash tree to generate a combined hash, and may hash the combined hash to generate composite identity 130. In some implementations, identity generation platform 102 may generate the hash tree using a bottom-up approach. For example, identity generation platform 102 may combine sub-identities to form identities, and may combine identities to form a composite identity.

In some implementations, identity generation platform 102 may generate a hierarchy of digital artifact identities 128 using the bottom-up approach. For example, identity generation platform 102 may generate digital artifact identities for each artifact, and may categorize each artifact into a particular category, such as in-house source code, external third-party components, software runtime dependencies, hardware runtime dependencies, and/or the like. In this case, identity generation platform 102 may generate a set of category identities based on hashing digital artifact identities 128 of each category. In this case, identity generation platform 102 may store each category hash in a smart contract-based blockchain. Further, identity generation platform 102 may classify each category into an intermediate group, such as a functional components group (e.g., the in-house source code and the external third-party components), a deployment dependencies group (e.g., the software runtime dependencies and the hardware runtime dependencies), and/or the like. In this case, identity generation platform 102 may generate intermediate identities for each intermediate group, and may use the intermediate identities to generation an application identity for S, which may be composite identity 130. Further, identity generation platform 102 may store each intermediate identity in a smart contract-based blockchain. In this way, by storing each hierarchical level of identity in a blockchain, identity generation platform 102 enables secure storage and recall of each level of identity when verifying an identity.

In this case, by using blockchain 132 to store composite identity 130, identity generation platform 102 ensures that composite identity 130 may be trusted as a genuine composite identity of S, thereby reducing a likelihood of subsequent security vulnerabilities. In other words, based on using blockchain 132 to store composite identity 130, identity generation platform 102 may use blockchain 132 to verify that composite identity 130 has not been altered, thereby enabling identity generation platform 102 to trust that the composite identity 130 that identity generation platform 102 obtains from blockchain 132 is the same composite identity 130 that identity generation platform 102 generated and stored using blockchain 132. Moreover, by generating the hash tree off-chain in a development environment, rather than on-chain in a blockchain environment, and then by storing the off-chain generated hash tree to a blockchain, identity generation platform 102 improves performance of hash tree generation relative to on-chain hash tree generation.

Figure 1D:
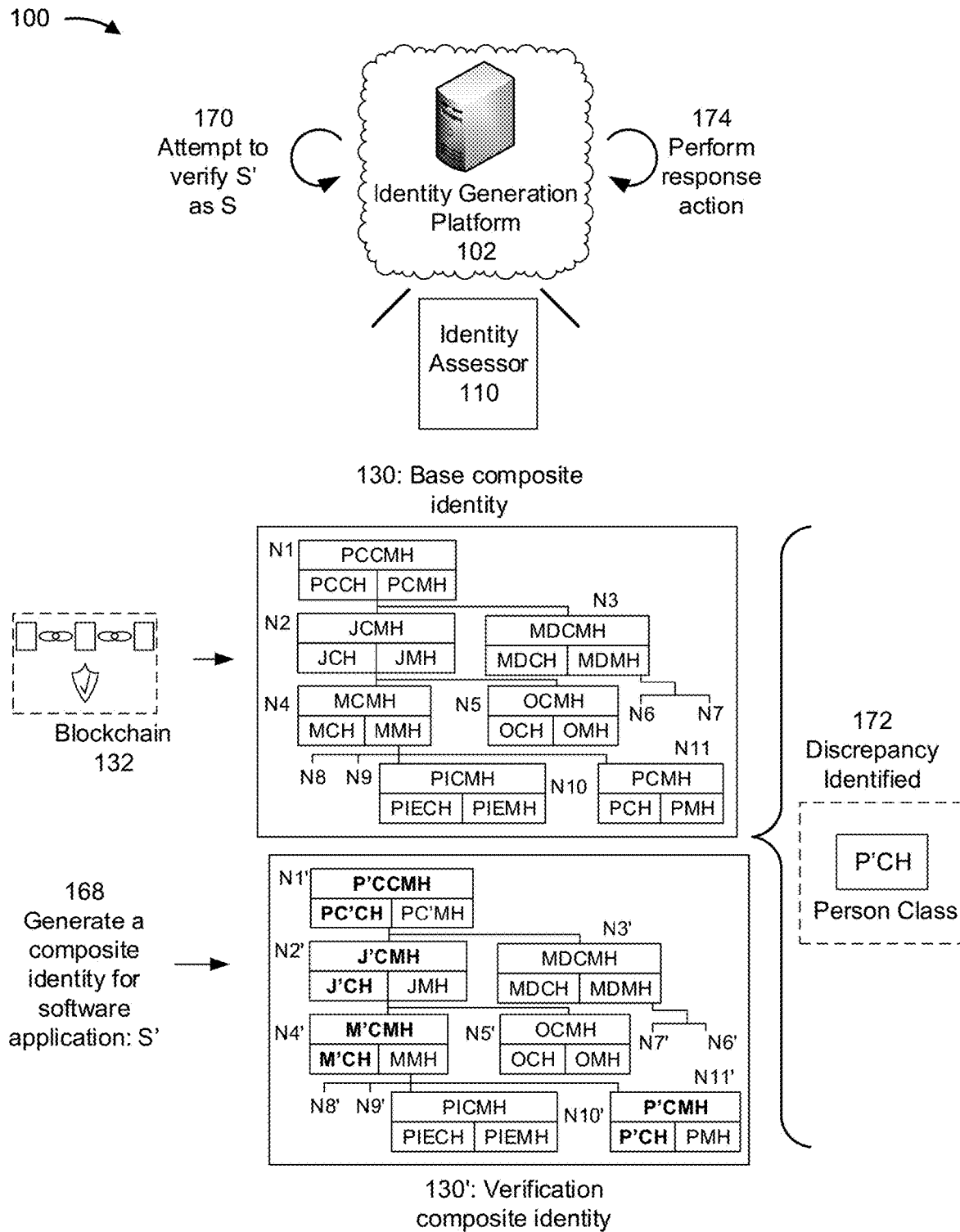

As shown in FIG. 1D, and by reference number 168, identity generation platform 102 may generate a composite identity for a software application, S', to verify that S' is S. For example, identity generation platform 102 may generate a verification composite identity 130' of S' for comparison to base composite identity 130 of S, which may be obtained from blockchain 132. In this case, by obtaining composite identity 130 from blockchain 132, identity generation platform 102 reduces a likelihood that base composite identity 130 is not genuine to S relative to obtaining base composite identity 130 from a non-secure storage type, as described in more detail below.

As further shown in FIG. 1D, and by reference number 170, identity generation platform 102, using identity assessor 110, may attempt to verify that S' is S. For example, identity generation platform 102 may compare base composite identity 130 to verification composite identity 130' to determine whether base composite identity 130 and verification composite identity 130' have a common hash value. In this case, when base composite identity 130 matches verification composite identity 130', identity generation platform 102 may determine that S' is genuine (e.g., that S' is S).

In contrast, when base composite identity 130 does not match verification composite identity 130', identity generation platform 102 may determine that S' is not genuine. In this case, identity generation platform 102 may traverse respective hash trees of base composite identity 130 and verification composite identity 130' to identify a discrepancy. For example, as shown, identity generation platform 102 may determine that N1' does not match N1. Further, identity generation platform 102 may continue to traverse the respective hash trees to determine that N2' does not match N2 and N3' does match N3. In this case, based on N3' matching N3, identity generation platform 102 may determine that all hierarchically inferior nodes of N3' (e.g., leaves of branch N3') match N3, and may omit the hierarchically inferior nodes from assessment, thereby reducing a utilization of processing resources. Further, identity generation platform 102 may traverse hierarchically inferior nodes of N2' to determine that hash P'CH of N10' does not match hash PCH of N10.

In some implementations, identity generation platform 102 may perform a breadth-first traversal of the hash tree to identify the discrepancy. For example, identity generation platform 102 may perform concurrent breadth-first traversal of hash trees of S and S', and may store mismatched nodes to a data structure. In this case, when a hierarchical level is complete, identity generation platform 102 may determine, based on the stored mismatched nodes, which portions of the hash trees to continue to traverse at a lower level. In this way, identity generation platform 102 ensures that only mismatched branches are traversed, thereby reducing processing relative to traversing all branches of the respective trees. Further, in this way, identity generation platform 102 may localize the discrepancy as occurring in digital artifact metadata of an artifact of S' corresponding to node N10, as shown by reference number 172.

As further shown in FIG. 1D, and by reference number 174, based on attempting to verify S', identity generation platform 102 may perform a response action. For example, when a discrepancy is identified, identity generation platform 102 may automatically resolve the discrepancy by replacing the artifact of S' corresponding to node N10. Additionally, or alternatively, identity generation platform 102 may forgo executing application S', may execute application S' in a sandbox environment, and/or the like. Additionally, or alternatively, when S' is verified, identity generation platform 102 may execute S', may allow downloading of S' to a user device, may allow uploading of S' from a user device, and/or the like. In some implementations, identity generation platform 102 may generate an alert relating to determining that S' is associated with a discrepancy. For example, identity generation platform 102 may transmit an alert to an application store to cause the application store to disable downloads of S', to a vendor to cause the vendor to stop using S', and/or the like. Additionally, or alternatively, identity generation platform 102 may add code to S' to stop S' from operating, thereby reducing a likelihood of S' causing a security issue.

As indicated above, FIGS. 1A-1D are provided merely as one or more examples. Other examples may differ from what is described with regard to FIGS. 1A-1D.

Figure 2:
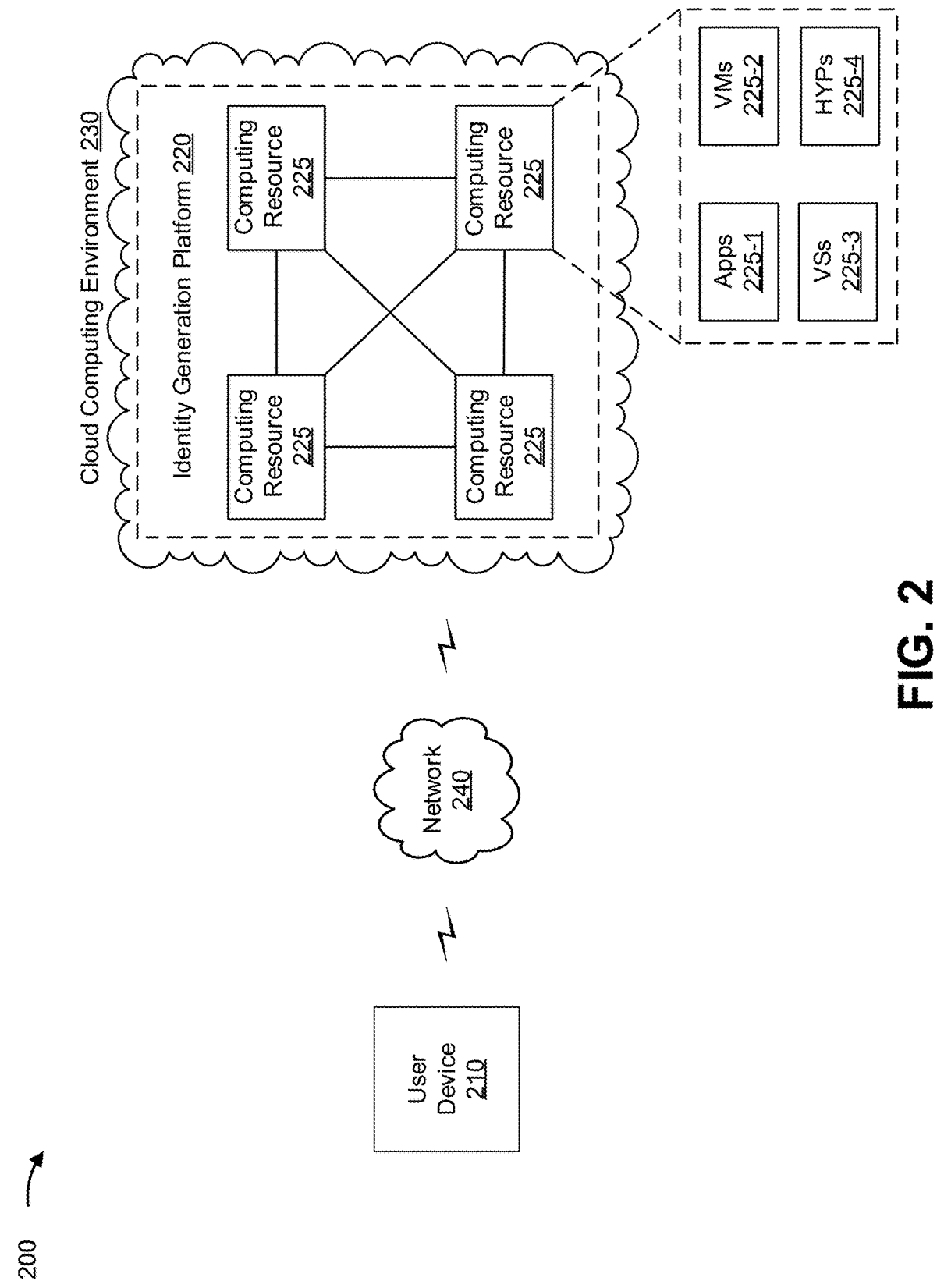
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, an identity generation platform 220, a computing resource 225, a cloud computing resource 230, and a network 240. Devices of environment 200 may interconnect via wired connections, wireless connections, or a combination of wired and wireless connections.

User device 210 includes one or more devices capable of receiving, generating, storing, processing, and/or providing information associated with a composite identity for a software application. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Identity generation platform 220 includes one or more computing resources assigned to generate a composite identity and/or assess whether a verification composite identity matches a base composite identity. For example, identity generation platform 220 may be a platform implemented by cloud computing environment 230 that may generate a composite identity, determine whether the composite identity matches another composite identity, resolve any discrepancies between the composite identity and the other composite identity, and/or the like. In some implementations, identity generation platform 220 is implemented by computing resources 225 of cloud computing environment 230.

Identity generation platform 220 may include a server device or a group of server devices. In some implementations, identity generation platform 220 may be hosted in cloud computing environment 230. Notably, while implementations described herein describe identity generation platform 220 as being hosted in cloud computing environment 230, in some implementations, identity generation platform 220 may be non-cloud-based or may be partially cloud-based.

Cloud computing environment 230 includes an environment that delivers computing as a service, whereby shared resources, services, etc. may be provided to user device 210, identity generation platform 220, and/or the like. Cloud computing environment 230 may provide computation, software, data access, storage, and/or other services that do not require end-user knowledge of a physical location and configuration of a system and/or a device that delivers the services. As shown, cloud computing environment 230 may include identity generation platform 220 and computing resource 225.

Computing resource 225 includes one or more personal computers, workstation computers, server devices, or another type of computation and/or communication device. In some implementations, computing resource 225 may host identity generation platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by user device 210. Application 225-1 may eliminate a need to install and execute the software applications on user device 210. For example, application 225-1 may include software associated with identity generation platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS").

A process virtual machine may execute a single program and may support a single process. In some implementations, virtual machine 225-2 may execute on behalf of a user (e.g., user device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems and may manage the execution of the guest operating systems. Multiple instances of a variety of operating systems may share virtualized hardware resources.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
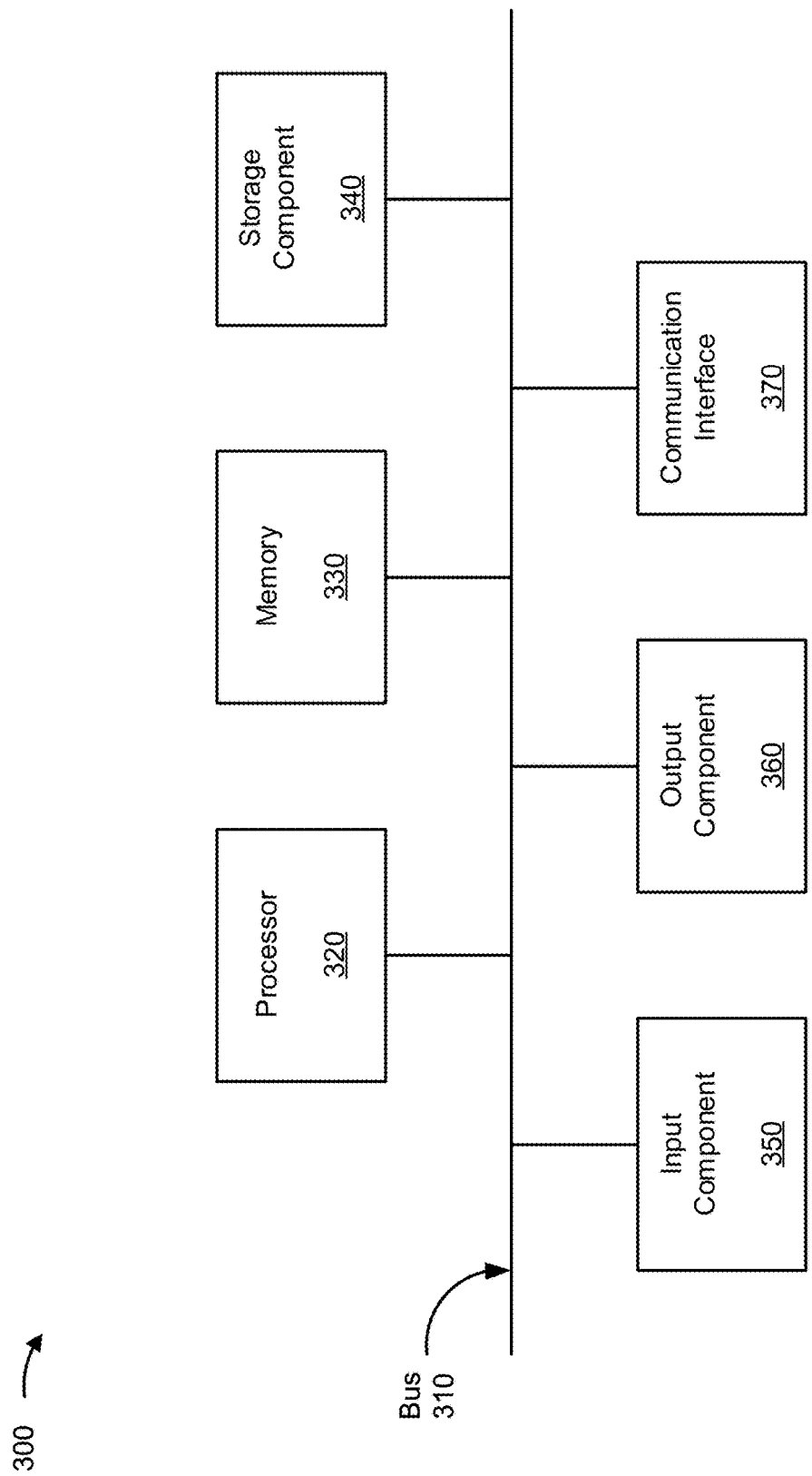
FIG. 3 is a diagram of example components of one or more devices of FIG. 2.

FIG. 3 is a diagram of example components of a device 300. Device 300 may correspond to user device 210, identity generation platform 220, and/or computing resource 225. In some implementations, user device 210, identity generation platform 220, and/or computing resource 225 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
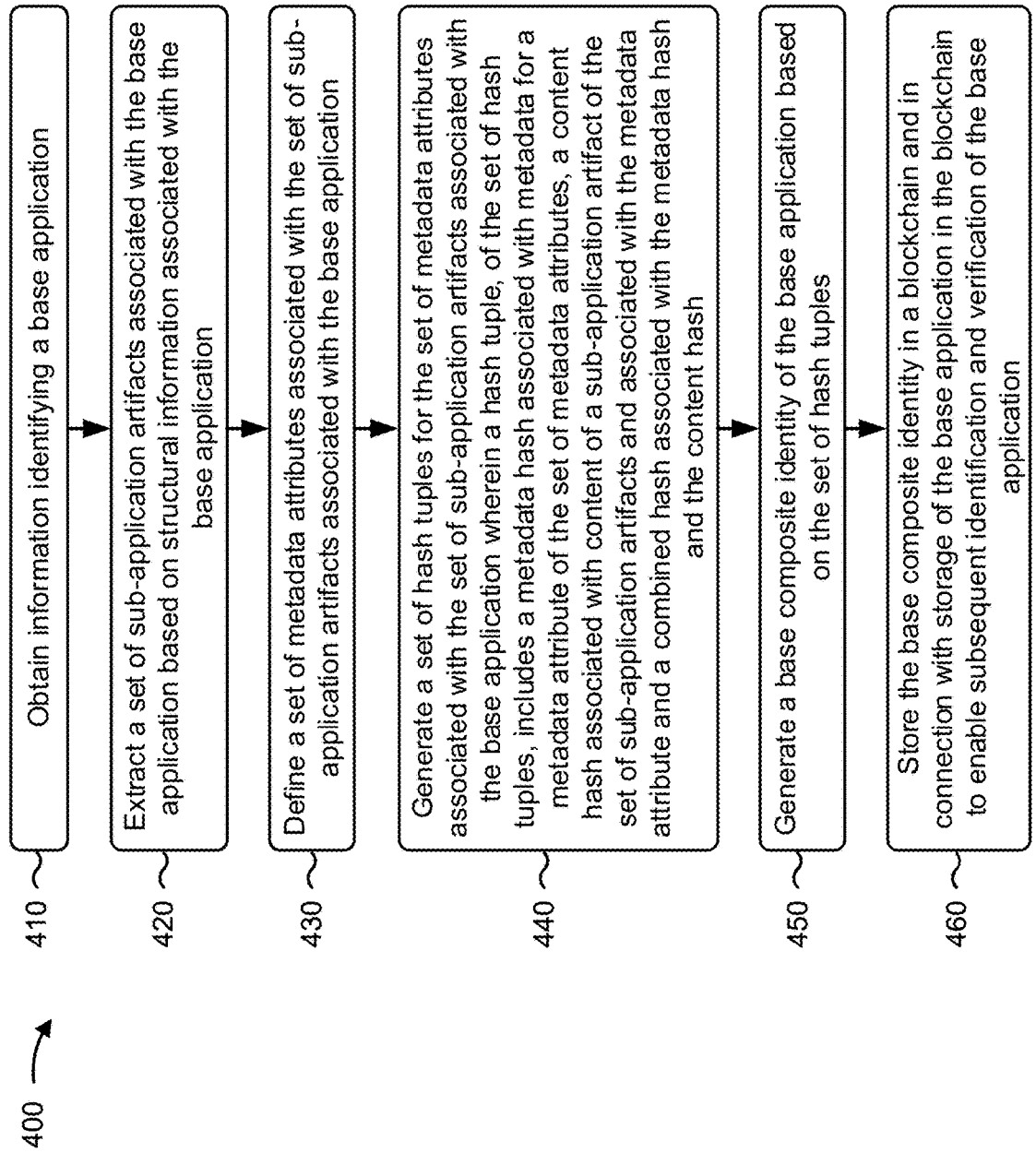
FIGS. 4-6 are flow charts of example processes for blockchain based digital identity generation and verification.

FIG. 4 is a flow chart of an example process 400 for blockchain based digital identity generation and verification. In some implementations, one or more process blocks of FIG. 4 may be performed by identity generation platform (e.g., identity generation platform 220). In some implementations, one or more process blocks of FIG. 4 may be performed by another device or a group of devices separate from or including the identity generation platform, such as a user device (e.g., user device 210), a computing resource (e.g., computing resource 225), and/or the like.

As shown in FIG. 4, process 400 may include obtaining, by a device, information identifying a base application (block 410). For example, the identity generation platform (e.g., using processor 320, memory 330, storage component 340, input component 350, output component 360, communication interface 370 and/or the like) may obtain, by a device, information identifying a base application, as described above.

As further shown in FIG. 4, process 400 may include extracting, by the device, a set of sub-application artifacts associated with the base application based on structural information associated with the base application (block 420). For example, the identity generation platform (e.g., using processor 320, memory 330, storage component 340, input component 350, output component 360, communication interface 370 and/or the like) may extract, by the device, a set of sub-application artifacts associated with the base application based on structural information associated with the base application, as described above.

As further shown in FIG. 4, process 400 may include defining, by the device, a set of metadata attributes associated with the set of sub-application artifacts associated with the base application (block 430). For example, the identity generation platform (e.g., using processor 320, memory 330, storage component 340, input component 350, output component 360, communication interface 370 and/or the like) may define, by the device, a set of metadata attributes associated with the set of sub-application artifacts associated with the base application, as described above.

As further shown in FIG. 4, process 400 may include generating, by the device, a set of hash tuples for the set of metadata attributes associated with the set of sub-application artifacts associated with the base application wherein a hash tuple, of the set of hash tuples, includes a metadata hash associated with metadata for a metadata attribute of the set of metadata attributes, a content hash associated with content of a sub-application artifact of the set of sub-application artifacts and associated with the metadata attribute and a combined hash associated with the metadata hash and the content hash (block 440). For example, the identity generation platform (e.g., using processor 320, memory 330, storage component 340, input component 350, output component 360, communication interface 370 and/or the like) may generate, by the device, a set of hash tuples for the set of metadata attributes associated with the set of sub-application artifacts associated with the base application, as described above. In some aspects, a hash tuple, of the set of hash tuples, includes a metadata hash associated with metadata for a metadata attribute of the set of metadata attributes, a content hash associated with content of a sub-application artifact of the set of sub-application artifacts and associated with the metadata attribute and a combined hash associated with the metadata hash and the content hash.

As further shown in FIG. 4, process 400 may include generating, by the device, a base composite identity of the base application based on the set of hash tuples (block 450). For example, the identity generation platform (e.g., using processor 320, memory 330, storage component 340, input component 350, output component 360, communication interface 370 and/or the like) may generate, by the device, a base composite identity of the base application based on the set of hash tuples, as described above.

As further shown in FIG. 4, process 400 may include storing, by the device, the base composite identity in a blockchain and in connection with storage of the base application in the blockchain to enable subsequent identification and verification of the base application (block 460). For example, the identity generation platform (e.g., using processor 320, memory 330, storage component 340, input component 350, output component 360, communication interface 370 and/or the like) may store, by the device, the base composite identity in a blockchain and in connection with storage of the base application in the blockchain to enable subsequent identification and verification of the base application, as described above.

Process 400 may include additional implementations, such as any single implementation or any combination of implementations described below and/or in connection with one or more other processes described elsewhere herein.

In some implementations, generating a verification composite identity based on a candidate application includes comparing the verification composite identity to the base composite identity. In some implementations, verifying whether the candidate application is the base application based on comparing the verification composite identity to the base composite identity stored in the blockchain.

In some implementations, comparing the verification composite identity to the base composite identity includes retrieving a base root hash of the base composite identity from the blockchain; comparing the base root hash of the base composite identity to a verification root hash of the verification composite identity. In some implementations, process 400 may further include verifying the candidate application.

In some implementations, comparing the verification composite identity to the base composite identity includes determining that a base root hash of the base composite identity does not match a verification root hash of the verification composite identity; comparing hash tuples of nodes of the base composite identity and corresponding hash tuples of nodes of the verification composite identity to identify one or more nodes of the base composite identity and that do not match one or more corresponding nodes of the verification composite identity; and providing information identifying one or more sub-application artifacts of the candidate application that are not verified as matching one or more corresponding sub-application artifacts of the base application based on comparing the hash tuples of nodes of the base composite identify and the corresponding hash tuples of nodes of the verification composite identity.

In some implementations, process 400 further includes identifying an integrity issue between a candidate application and the base application based on the base composite identity of the base application. In some implementations, process 400 further includes automatically resolving the integrity issue in the candidate application by replacing one or more sub-application artifacts of the candidate application with one or more corresponding sub-application artifacts of the base application.

In some implementations, process 400 further includes obtaining an off chain sub-application artifact not included in the blockchain. In some implementations, automatically resolving the integrity issue includes automatically resolving the integrity issue in the candidate application using the off chain sub-application artifact.

In some implementations, process 400 further includes receiving a candidate application for execution. In some implementations, process 400 further includes identifying an integrity issue between the candidate application and the base application based on the base composite identity of the base application. In some implementations, process 400 further includes not executing the candidate application based on identifying the integrity issue between the candidate application and the base application.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
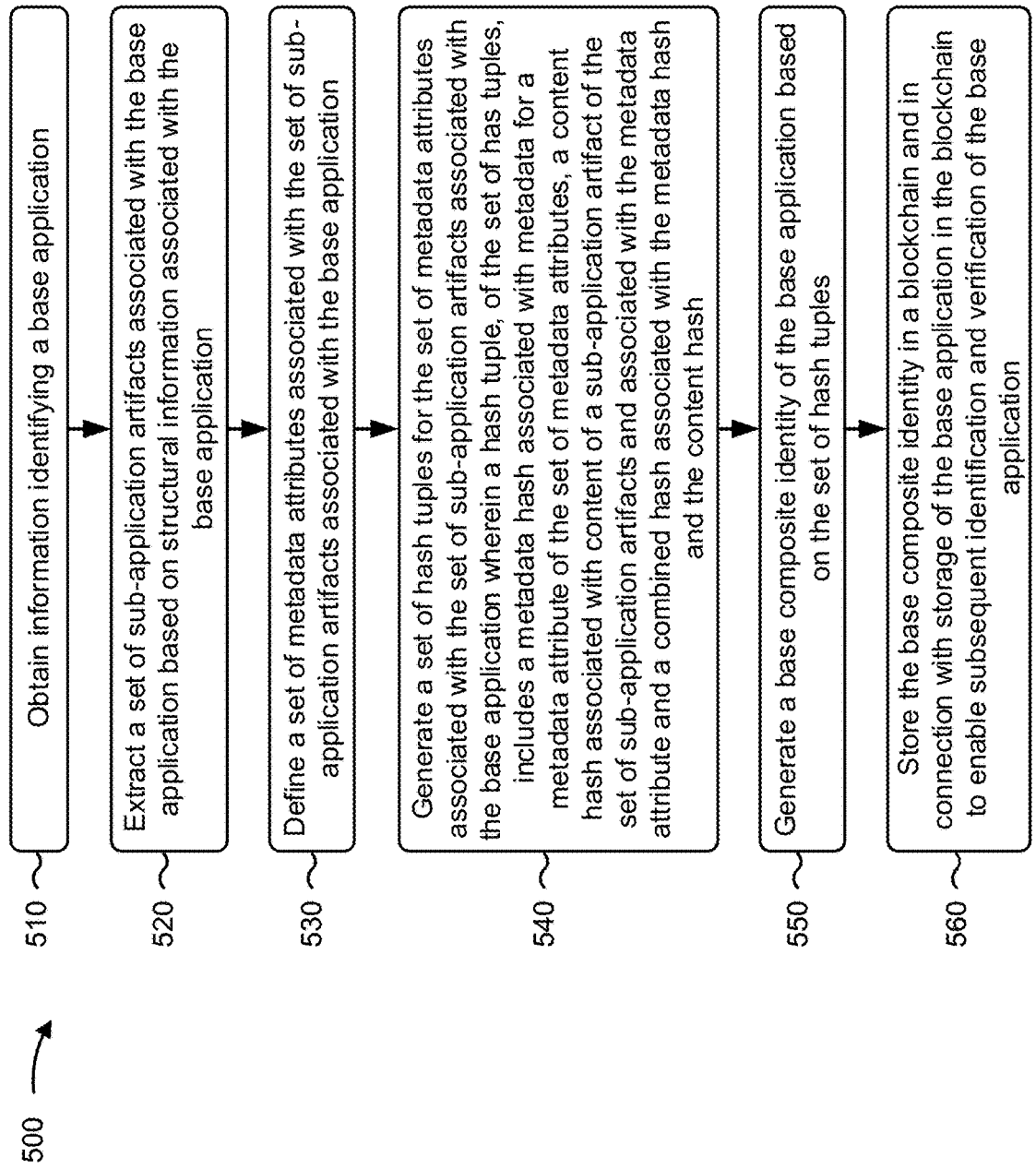

FIG. 5 is a flow chart of an example process 500 for blockchain based digital identity generation and verification. In some implementations, one or more process blocks of FIG. 5 may be performed by identity generation platform (e.g., identity generation platform 220). In some implementations, one or more process blocks of FIG. 5 may be performed by another device or a group of devices separate from or including the identity generation platform, such as a user device (e.g., user device 210), a computing resource (e.g., computing resource 225), and/or the like.

As shown in FIG. 5, process 500 may include obtaining information identifying a base application (block 510). For example, the identity generation platform (e.g., using processor 320, memory 330, storage component 340, input component 350, output component 360, communication interface 370 and/or the like) may obtain information identifying a base application, as described above.

As further shown in FIG. 5, process 500 may include extract a set of sub-application artifacts associated with the base application based on structural information associated with the base application (block 520). For example, the identity generation platform (e.g., using processor 320, memory 330, storage component 340, input component 350, output component 360, communication interface 370 and/or the like) may extract a set of sub-application artifacts associated with the base application based on structural information associated with the base application, as described above.

As further shown in FIG. 5, process 500 may include defining a set of metadata attributes associated with the set of sub-application artifacts associated with the base application (block 530). For example, the identity generation platform (e.g., using processor 320, memory 330, storage component 340, input component 350, output component 360, communication interface 370 and/or the like) may define a set of metadata attributes associated with the set of sub-application artifacts associated with the base application, as described above.

As further shown in FIG. 5, process 500 may include generating a set of hash tuples for the set of metadata attributes associated with the set of sub-application artifacts associated with the base application wherein a hash tuple, of the set of has tuples, includes a metadata hash associated with metadata for a metadata attribute of the set of metadata attributes, a content hash associated with content of a sub-application artifact of the set of sub-application artifacts and associated with the metadata attribute and a combined hash associated with the metadata hash and the content hash (block 540). For example, the identity generation platform (e.g., using processor 320, memory 330, storage component 340, input component 350, output component 360, communication interface 370 and/or the like) may generate a set of hash tuples for the set of metadata attributes associated with the set of sub-application artifacts associated with the base application, as described above. In some aspects, a hash tuple, of the set of has tuples, includes a metadata hash associated with metadata for a metadata attribute of the set of metadata attributes, a content hash associated with content of a sub-application artifact of the set of sub-application artifacts and associated with the metadata attribute and a combined hash associated with the metadata hash and the content hash.

As further shown in FIG. 5, process 500 may include generating a base composite identity of the base application based on the set of hash tuples (block 550). For example, the identity generation platform (e.g., using processor 320, memory 330, storage component 340, input component 350, output component 360, communication interface 370 and/or the like) may generate a base composite identity of the base application based on the set of hash tuples, as described above.

As further shown in FIG. 5, process 500 may include storing the base composite identity in a blockchain and in connection with storage of the base application in the blockchain to enable subsequent identification and verification of the base application (block 560). For example, the identity generation platform (e.g., using processor 320, memory 330, storage component 340, input component 350, output component 360, communication interface 370 and/or the like) may store the base composite identity in a blockchain and in connection with storage of the base application in the blockchain to enable subsequent identification and verification of the base application, as described above.

Process 500 may include additional implementations, such as any single implementation or any combination of implementations described below and/or in connection with one or more other processes described elsewhere herein.

In some implementations, the identity generation platform is further configured to generate a verification composite identity based on a candidate application, compare the verification composite identity to the base composite identity, and verify whether the candidate application is the base application based on comparing the verification composite identity to the base composite identity stored in the blockchain.

In some implementations, the identity generation platform, when comparing the verification composite identity to the base composite identity, is configured to retrieve a base root hash of the base composite identity from the blockchain and compare the base root hash of the base composite identity to a verification root hash of the verification composite identity. In some implementations, the base root hash represents a hash associated with the base composite identity and hash tuples of the base application. In some implementations, the identity generation platform, when verifying the candidate application, is configured to verify whether the candidate application is the base application based on comparing the base root hash to the verification root hash.

In some implementations, the identity generation platform, when comparing the verification composite identity to the base composite identity, is configured to determine that a base root hash of the base composite identity does not match a verification root hash of the verification composite identity, compare hash tuples of nodes of the base composite identity and corresponding hash tuples of nodes of the verification composite identity to identify one or more nodes of the base composite identity and that do not match one or more corresponding nodes of the verification composite identity and, provide information identifying one or more sub-application artifacts of the candidate application that are not verified as matching one or more corresponding sub-application artifacts of the base application based on comparing the hash tuples of nodes of the base composite identify and the corresponding hash tuples of nodes of the verification composite identity.

In some implementations, the identity generation platform is further configured to receive a candidate application for execution, identify an integrity issue between the candidate application and the base application based on the base composite identity of the base application, and refrain from executing the candidate application based on identifying the integrity issue between the candidate application and the base application.

In some implementations, the identity generation platform is further configured to receive a candidate application for execution, identify an integrity issue between the candidate application and the base application based on the base composite identity of the base application, and execute the candidate application in a sandbox environment based on identifying the integrity issue between the candidate application and the base application.

In some implementations, the identity generation platform is further configured to receive a candidate application for execution, identify a match between the candidate application and the base application based on the base composite identity of the base application, and execute the candidate application based on identifying the match between the candidate application and the base application.

In some implementations, the base composite identity is a tree, including a plurality of hierarchically arranged nodes corresponding to a plurality of hierarchically arranged sub-application artifacts of the set of sub-application artifacts, and a node, of the plurality of hierarchically arranged nodes, is associated with a hash tuple representing a hash of a sub-application artifact corresponding to the node and a hash of any hierarchically inferior sub-application artifacts corresponding to any hierarchically inferior nodes of the node.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
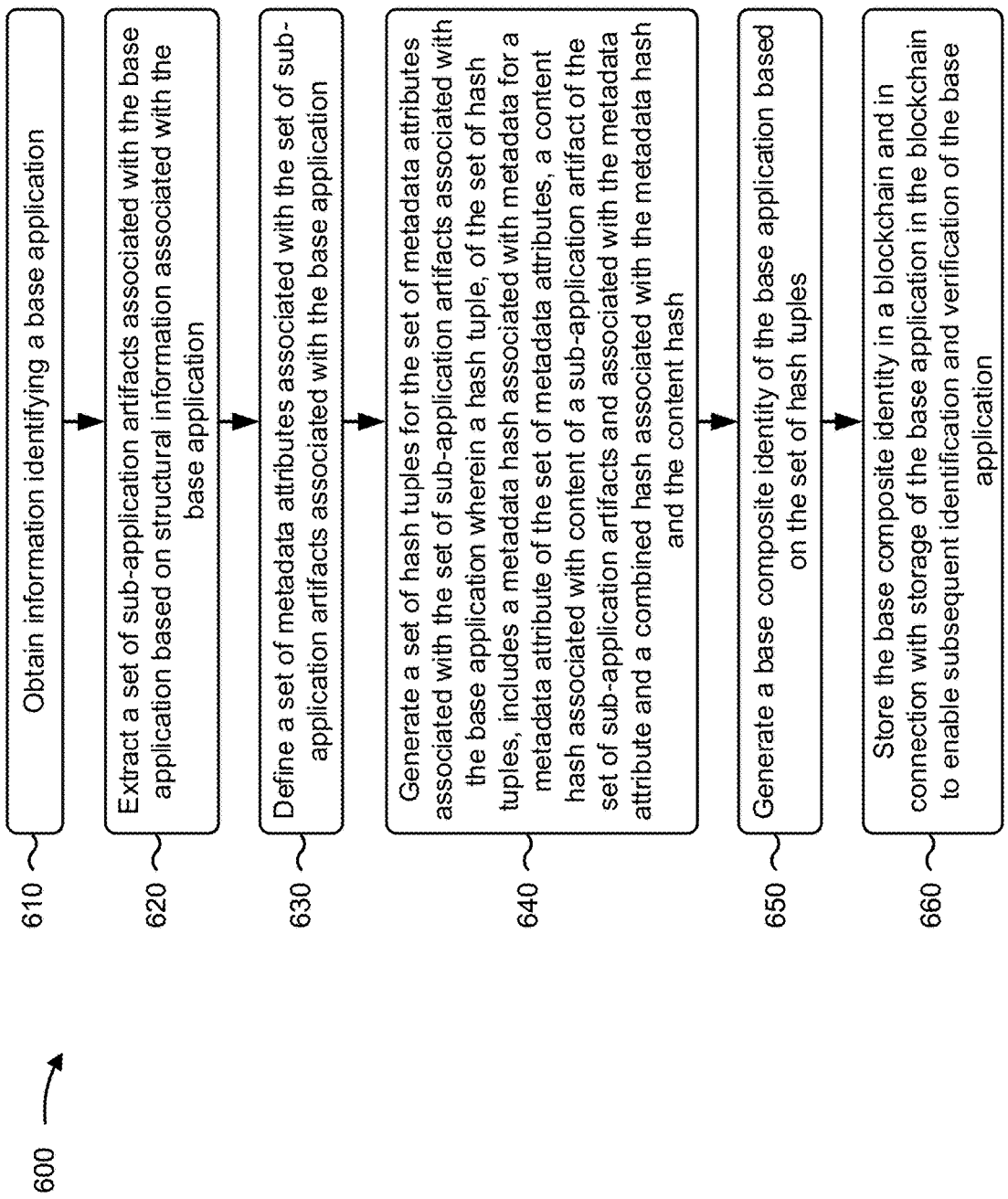

FIG. 6 is a flow chart of an example process 600 for blockchain based digital identity generation and verification. In some implementations, one or more process blocks of FIG. 6 may be performed by identity generation platform (e.g., identity generation platform 220). In some implementations, one or more process blocks of FIG. 6 may be performed by another device or a group of devices separate from or including the identity generation platform, such as a user device (e.g., user device 210), a computing resource (e.g., computing resource 225), and/or the like.

As shown in FIG. 6, process 600 may include obtaining information identifying a base application (block 610). For example, the identity generation platform (e.g., using processor 320, memory 330, storage component 340, input component 350, output component 360, communication interface 370 and/or the like) may obtain information identifying a base application, as described above.

As further shown in FIG. 6, process 600 may include extract a set of sub-application artifacts associated with the base application based on structural information associated with the base application (block 620). For example, the identity generation platform (e.g., using processor 320, memory 330, storage component 340, input component 350, output component 360, communication interface 370 and/or the like) may extract a set of sub-application artifacts associated with the base application based on structural information associated with the base application, as described above.

As further shown in FIG. 6, process 600 may include defining a set of metadata attributes associated with the set of sub-application artifacts associated with the base application (block 630). For example, the identity generation platform (e.g., using processor 320, memory 330, storage component 340, input component 350, output component 360, communication interface 370 and/or the like) may define a set of metadata attributes associated with the set of sub-application artifacts associated with the base application, as described above.

As further shown in FIG. 6, process 600 may include generating a set of hash tuples for the set of metadata attributes associated with the set of sub-application artifacts associated with the base application wherein a hash tuple, of the set of hash tuples, includes a metadata hash associated with metadata for a metadata attribute of the set of metadata attributes, a content hash associated with content of a sub-application artifact of the set of sub-application artifacts and associated with the metadata attribute and a combined hash associated with the metadata hash and the content hash (block 640). For example, the identity generation platform (e.g., using processor 320, memory 330, storage component 340, input component 350, output component 360, communication interface 370 and/or the like) may generate a set of hash tuples for the set of metadata attributes associated with the set of sub-application artifacts associated with the base application, as described above. In some aspects, a hash tuple, of the set of hash tuples, includes a metadata hash associated with metadata for a metadata attribute of the set of metadata attributes, a content hash associated with content of a sub-application artifact of the set of sub-application artifacts and associated with the metadata attribute and a combined hash associated with the metadata hash and the content hash.

As further shown in FIG. 6, process 600 may include generating a base composite identity of the base application based on the set of hash tuples (block 650). For example, the identity generation platform (e.g., using processor 320, memory 330, storage component 340, input component 350, output component 360, communication interface 370 and/or the like) may generate a base composite identity of the base application based on the set of hash tuples, as described above.

As further shown in FIG. 6, process 600 may include storing the base composite identity in a blockchain and in connection with storage of the base application in the blockchain to enable subsequent identification and verification of the base application (block 660). For example, the identity generation platform (e.g., using processor 320, memory 330, storage component 340, input component 350, output component 360, communication interface 370 and/or the like) may store the base composite identity in a blockchain and in connection with storage of the base application in the blockchain to enable subsequent identification and verification of the base application, as described above.

Process 600 may include additional implementations, such as any single implementation or any combination of implementations described below and/or in connection with one or more other processes described elsewhere herein.

In some implementations, the base composite identity is a tree, including a plurality of hierarchically arranged nodes corresponding to a plurality of hierarchically arranged sub-application artifacts of the set of sub-application artifacts and, a node, of the plurality of hierarchically arranged nodes, is associated with a hash tuple representing a hash of a sub-application artifact corresponding to the node and a hash of any hierarchically inferior sub-application artifacts corresponding to any hierarchically inferior nodes of the node.

In some implementations, the identity generation platform may traverse the tree to identify one or more nodes of the plurality of hierarchically arranged nodes that do not match a corresponding node of a verification composite identity of a candidate application.

In some implementations, the identity generation platform may omit, from traversal of the tree, one or more leaf nodes of a branch for which a root hash tuple of the branch matches a corresponding root hash tuple of a corresponding branch.

In some implementations, a candidate application is deployed in a cloud environment or an untrusted environment. In some implementations, the identity generation platform may periodically verify the candidate application against the base application using the base composite identity, identify, based on periodically verifying the candidate application against the base application, an integrity issue with the candidate application, and provide a tampering alert relating to the cloud environment or the untrusted environment based on identifying the integrity issue.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   obtaining, by a device, information identifying a base application;
   extracting, by the device, a plurality of sub-application artifacts associated with the base application based on structural information associated with the base application;
   defining, by the device, a plurality of metadata attributes associated with the plurality of sub-application artifacts;
   generating, by the device and based on the plurality of sub-application artifacts and the plurality of metadata attributes, a plurality of hash tuples for the plurality of metadata attributes,
      wherein each hash tuple, of the plurality of hash tuples, is for a different metadata attribute, of the plurality of metadata attributes, and includes:
         a metadata hash associated with metadata for the different metadata attribute,
         a content hash associated with content of a different sub-application artifact, of the plurality of sub-application artifacts and associated with the different metadata attribute, and
         a combined hash associated with the metadata hash and the content hash;
   generating, by the device, a base composite identity of the base application based on the plurality of hash tuples; and
   storing, by the device, the base composite identity in a blockchain to enable subsequent identification and verification of the base application.

2. The method of claim 1, further comprising:
   generating a verification composite identity based on a candidate application;
   comparing the verification composite identity to the base composite identity; and
   verifying whether the candidate application is the base application based on comparing the verification composite identity to the base composite identity.

3. The method of claim 2, wherein comparing the verification composite identity to the base composite identity comprises:
   retrieving a base root hash of the base composite identity from the blockchain;
   comparing the base root hash of the base composite identity to a verification root hash of the verification composite identity, wherein the base root hash represents a hash associated with the base composite identity and hash tuples of the base application; and
wherein verifying the candidate application comprises:
verifying whether the candidate application is the base application based on comparing the base root hash to the verification root hash.

4. The method of claim 2, wherein comparing the verification composite identity to the base composite identity comprises:
determining that a base root hash of the base composite identity does not match a verification root hash of the verification composite identity;
comparing hash tuples of nodes of the base composite identity and corresponding hash tuples of nodes of the verification composite identity to identify one or more nodes of the base composite identity that do not match one or more corresponding nodes of the verification composite identity; and
providing information identifying one or more sub-application artifacts of the candidate application that are not verified as matching one or more corresponding sub-application artifacts of the base application based on comparing the hash tuples of nodes of the base composite identify and the corresponding hash tuples of nodes of the verification composite identity.

5. The method of claim 1, further comprising:
identifying an integrity issue between a candidate application and the base application based on the base composite identity of the base application; and
automatically resolving the integrity issue in the candidate application by replacing one or more sub-application artifacts of the candidate application with one or more corresponding sub-application artifacts of the base application.

6. The method of claim 5, further comprising:
obtaining an off chain sub-application artifact not included in the blockchain; and
wherein automatically resolving the integrity issue comprises:
automatically resolving the integrity issue in the candidate application using the off chain sub-application artifact.

7. The method of claim 1, further comprising:
receiving a candidate application for execution;
identifying an integrity issue between the candidate application and the base application based on the base composite identity; and
not executing the candidate application based on identifying the integrity issue between the candidate application and the base application.

8. A device, comprising:
one or more memories; and
one or more processors, communicatively coupled to the one or more memories, configured to:
obtain information identifying a base application;
extract a plurality of sub-application artifacts associated with the base application based on structural information associated with the base application;
define a plurality of metadata attributes associated with the plurality of sub-application artifacts;
generate, based on the plurality of sub-application artifacts and the plurality of metadata attributes, a plurality of hash tuples for the plurality of metadata attributes,
wherein each hash tuple, of the plurality of hash tuples, is for a different metadata attribute, of the plurality of metadata attributes, and includes:
a metadata hash associated with metadata for the different metadata attribute,
a content hash associated with content of a different sub-application artifact, of the plurality of sub-application artifacts and associated with the different metadata attribute, and
a combined hash associated with the metadata hash and the content hash;
generate a base composite identity of the base application based on the plurality of hash tuples; and
store the base composite identity in a blockchain to enable subsequent identification and verification of the base application.

9. The device of claim 8, wherein the one or more processors are further configured to:
generate a verification composite identity based on a candidate application;
compare the verification composite identity to the base composite identity; and
verify whether the candidate application is the base application based on comparing the verification composite identity to the base composite identity stored in the blockchain.

10. The device of claim 9, wherein the one or more processors, when comparing the verification composite identity to the base composite identity, are configured to:
retrieve a base root hash of the base composite identity from the blockchain;
compare the base root hash of the base composite identity to a verification root hash of the verification composite identity,
wherein the base root hash represents a hash associated with the base composite identity and hash tuples of the base application; and
wherein the one or more processors, when verifying the candidate application, are configured to:
verify whether the candidate application is the base application based on comparing the base root hash to the verification root hash.

11. The device of claim 9, wherein the one or more processors, when comparing the verification composite identity to the base composite identity, are configured to:
determine that a base root hash of the base composite identity does not match a verification root hash of the verification composite identity;
compare hash tuples of nodes of the base composite identity and corresponding hash tuples of nodes of the verification composite identity to identify one or more nodes of the base composite identity that do not match one or more corresponding nodes of the verification composite identity; and
provide information identifying one or more sub-application artifacts of the candidate application that are not verified as matching one or more corresponding sub-application artifacts of the base application based on comparing the hash tuples of nodes of the base composite identify and the corresponding hash tuples of nodes of the verification composite identity.

12. The device of claim 8, wherein the one or more processors are further configured to:
receive a candidate application for execution;
identify an integrity issue between the candidate application and the base application based on the base composite identity of the base application; and refrain from executing the candidate application based on identifying the integrity issue between the candidate application and the base application.

13. The device of claim 8, wherein the one or more processors are further configured to:
receive a candidate application for execution;
identify an integrity issue between the candidate application and the base application based on the base composite identity of the base application; and
execute the candidate application in a sandbox environment based on identifying the integrity issue between the candidate application and the base application.

14. The device of claim 8, wherein the one or more processors are further configured to:
receive a candidate application for execution;
identify a match between the candidate application and the base application based on the base composite identity of the base application; and
execute the candidate application based on identifying the match between the candidate application and the base application.

15. The device of claim 8, wherein the base composite identity is a tree, comprising:
a plurality of hierarchically arranged nodes corresponding to a plurality of hierarchically arranged sub-application artifacts of the plurality of sub-application artifacts, and
wherein a node, of the plurality of hierarchically arranged nodes, is associated with a hash tuple representing a hash of a sub-application artifact corresponding to the node and a hash of any hierarchically inferior sub-application artifacts corresponding to any hierarchically inferior nodes of the node.

16. A non-transitory computer-readable medium storing instructions, the instructions comprising:
one or more instructions that, when executed by one or more processors, cause the one or more processors to:
obtain information identifying a base application;
extract a plurality of sub-application artifacts associated with the base application based on structural information associated with the base application;
define a plurality of metadata attributes associated with the plurality of sub-application artifacts;
generate, based on the plurality of sub-application artifacts and the plurality of metadata attributes, a plurality of hash tuples for the plurality of metadata attributes,
wherein each hash tuple, of the plurality of hash tuples, is for a different metadata attribute, of the plurality of metadata attributes, and includes:
a metadata hash associated with metadata for the different metadata attribute,
a content hash associated with content of a different sub-application artifact, of the plurality of sub-application artifacts and associated with the different metadata attribute, and
a combined hash associated with the metadata hash and the content hash;
generate a base composite identity of the base application based on the plurality of hash tuples; and
store the base composite identity in a blockchain and in connection with storage of the base application in the blockchain to enable subsequent identification and verification of the base application.

17. The non-transitory computer-readable medium of claim 16, wherein the base composite identity is a tree, comprising:
a plurality of hierarchically arranged nodes corresponding to a plurality of hierarchically arranged sub-application artifacts of the plurality of sub-application artifacts, and
wherein a node, of the plurality of hierarchically arranged nodes, is associated with a hash tuple representing a hash of a sub-application artifact corresponding to the node and a hash of any hierarchically inferior sub-application artifacts corresponding to any hierarchically inferior nodes of the node.

18. The non-transitory computer-readable medium of claim 17, wherein the one or more instructions, when executed by the one or more processors, further cause the one or more processors to:
traverse the tree to identify one or more nodes of the plurality of hierarchically arranged nodes that do not match a corresponding node of a verification composite identity of a candidate application.

19. The non-transitory computer-readable medium of claim 17, wherein the one or more instructions, that cause the one or more processors to traverse the tree, cause the one or more processors to:
omit, from traversal of the tree, one or more leaf nodes of a branch for which a root hash tuple of the branch matches a corresponding root hash tuple of a corresponding branch.

20. The non-transitory computer-readable medium of claim 16, wherein a candidate application is deployed in a cloud environment or an untrusted environment; and
wherein the instructions comprise one or more instructions that, when executed by the one or more processors, further cause the one or more processors to:
periodically verify the candidate application against the base application using the base composite identity;
identify, based on periodically verifying the candidate application against the base application, an integrity issue with the candidate application; and
provide a tampering alert relating to the cloud environment or the untrusted environment based on identifying the integrity issue.

\* \* \* \* \*